United States Patent [19]

Hakamada

[11] Patent Number: 4,746,983
[45] Date of Patent: May 24, 1988

[54] PICTURE-IN-PICTURE TELEVISION RECEIVER WITH SEPARATE CHANNEL DISPLAY

[75] Inventor: Kunio Hakamada, Tokyo, Japan

[73] Assignee: Sony Corporation, Tokyo, Japan

[21] Appl. No.: 944,660

[22] Filed: Dec. 19, 1986

[30] Foreign Application Priority Data

Dec. 28, 1985 [JP] Japan .................................. 60-297328
Jan. 8, 1986 [JP] Japan ..................................... 61-1643

[51] Int. Cl.$^4$ ........................ H04N 9/64; H04N 5/262
[52] U.S. Cl. ....................................... 358/183; 358/22; 358/903
[58] Field of Search .................. 358/183, 22, 182, 903

[56] References Cited

U.S. PATENT DOCUMENTS

| | | | |
|---|---|---|---|
| 3,943,280 | 3/1976 | Kimura et al. | 358/183 |
| 4,139,860 | 2/1979 | Miui et al. | 358/183 |
| 4,249,213 | 2/1981 | Umaide et al. | 358/183 |
| 4,612,569 | 9/1986 | Ichinose | 358/22 |
| 4,623,915 | 11/1986 | Bolger | 358/183 |
| 4,673,383 | 6/1987 | Samyaku et al. | 358/183 |
| 4,698,664 | 10/1987 | Nichols et al. | 358/22 |

OTHER PUBLICATIONS

TV Receiver Puts Two Pictures on Screen at Same Time, by Manfred Ullrich and Max Hegendoerfer, Electronics/Sep. 1, 1977.
Fully Digitalized Color Picture in Picture Television System, by Michio Masuda et al. IEEE Transactions on Consumer Electronics, vol. CE-25, Feb. 1979.

*Primary Examiner*—James J. Groody
*Assistant Examiner*—John K. Peng
*Attorney, Agent, or Firm*—Philip M. Shaw, Jr.

[57] ABSTRACT

A picture-in-picture type television receiver in which a sub-picture screen is inset within a main picture screen to allow the same or different pictures to be simultaneously displayed and which includes a circuit for separately displaying the channel numbers of both the main and sub-picture screens momentarily whenever the picture content of the sub-picture screen is changed and whenever the picture content of the main picture is changed if the sub-picture is display.

11 Claims, 5 Drawing Sheets

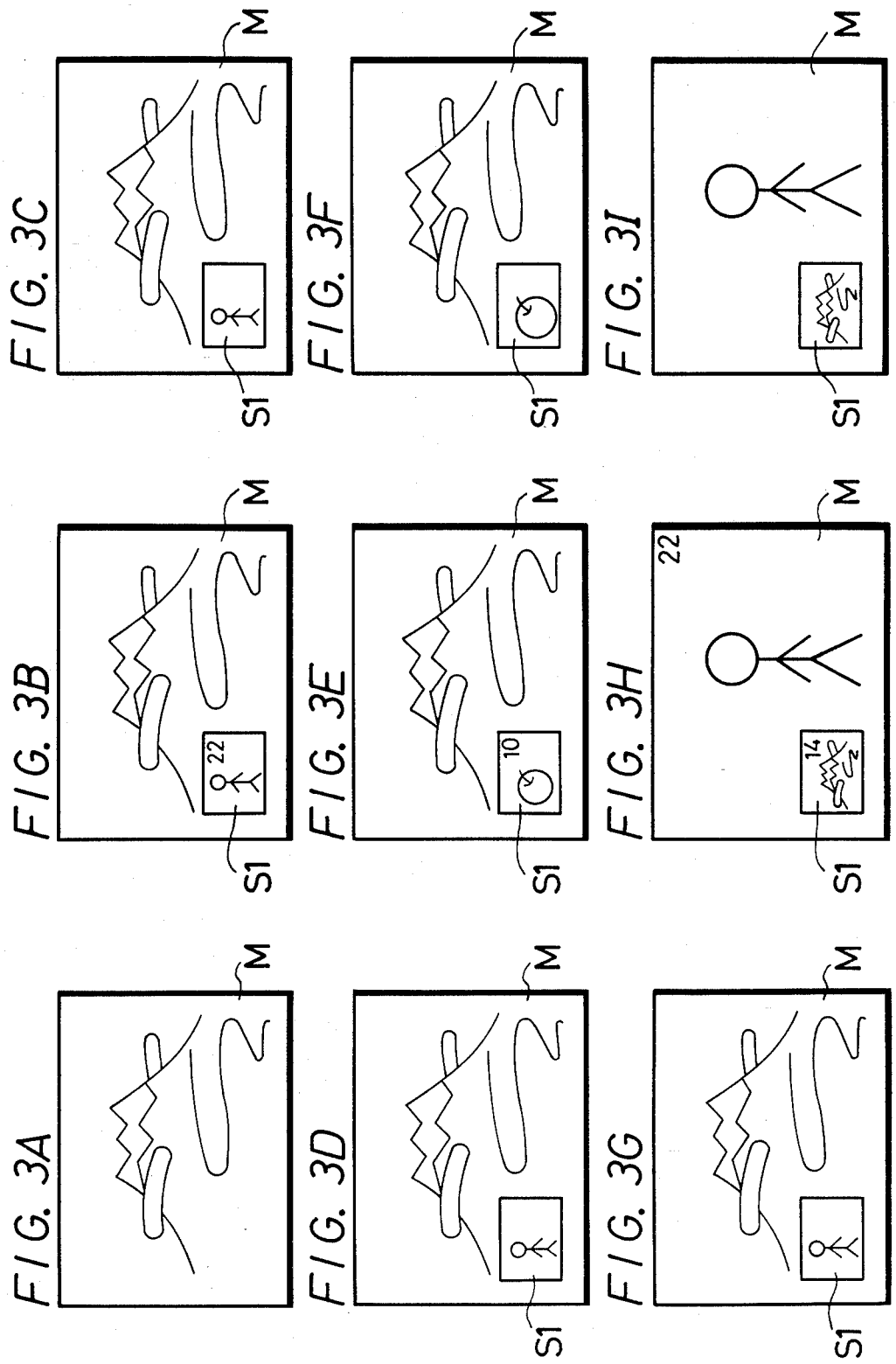

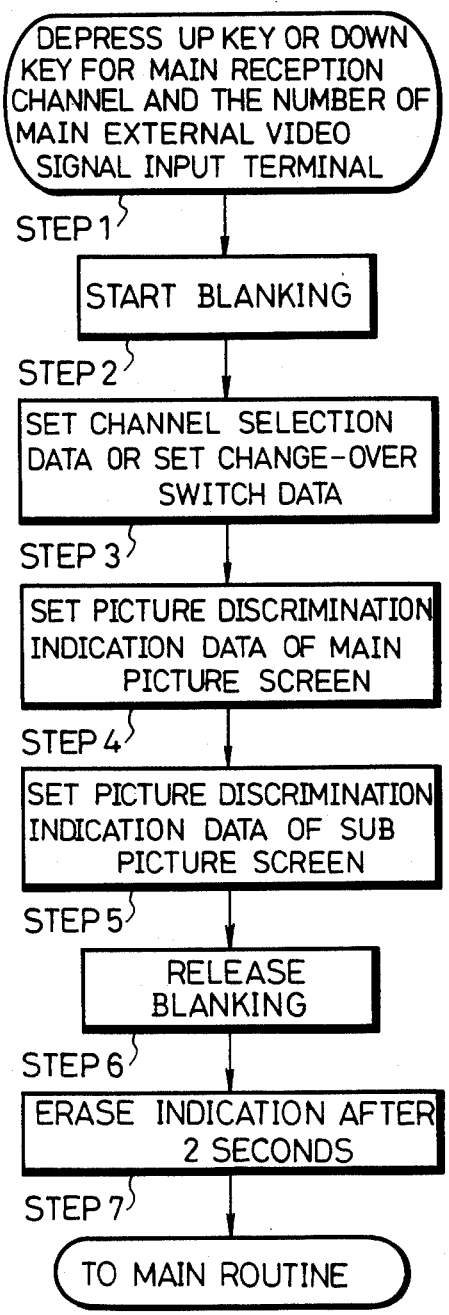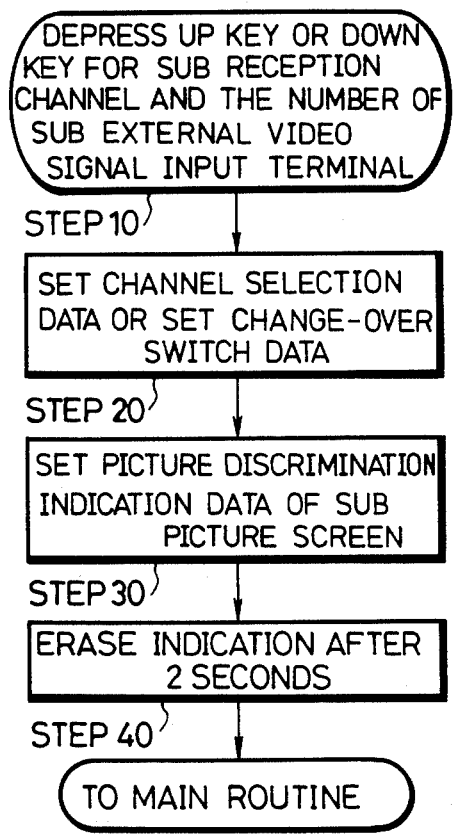
FIG. 4
FIG. 6

PICTURE-IN-PICTURE TELEVISION RECEIVER WITH SEPARATE CHANNEL DISPLAY

BACKGROUND OF THE INVENTION

1. Field of the Invention

The present invention relates generally to a socalled picture-in-picture type television receiver in which a sub-picture screen is inset into a main picture screen in a picture-in-picture fashion.

2. Description of the Prior Art

There is known a so-called picture-in-picture type television receiver in which a sub-picture screen is provided within a main picture screen such that pictures having different contents can be displayed on the main and sub-picture screens, respectively. According to this prior art television receiver, the television channels of the main picture and the sub-picture or the number of an external video signal input terminal are displayed on a front panel of the television receiver using a display apparatus such as an LED (light emitting diode) and the like or these numbers are displayed on the picture screen of the cathode ray tube. When these numbers, which are referred to herein as discrimination indications, are displayed on the screen, they are displayed on the main picture screen together.

Further, the picture-in-picture type television receiver is provided with a main tuner for selecting the video signal for the main picture screen and a sub-tuner for selecting a video signal for the sub-picture screen. In such a prior art television receiver, it is preferable that the channel selection operations can be carried out independently in the main and sub-tuners. Thus, the discrimination indications of the picture contents, for example, the indications of the channels selected, are independently carried out on the main and sub-picture screens in response to the respective channel selection operations.

However, in the prior art picture-in-picture type television receiver, the picture discrimination indications for discriminating the main picture screen and the sub-picture screen can not be positively carried out. There is no problem when the selected channel of the sub-tuner is changed, in that the change in the discrimination indication of the picture content is carried out only on the sub-picture screen. However, when the selected channel of the main tuner is changed, it causes a problem in that the picture discrimination indication for the picture content is carried out only on the main picture screen. That is, since it is apt to be regarded that the picture displayed on the sub-picture screen is subjected to the picture displayed on the main picture screen, in this case, it is preferable that the discrimination indication for the picture content is carried out also on the sub-picture screen.

OBJECTS AND SUMMARY OF THE INVENTION

Accordingly, it is an object of this invention to provide an improved picture-in-picture type television receiver.

Another object of this invention is to provide a novel television receiver of a picture-in-picture type in which the picture discrimination indications of the main picture screen and the sub-picture screen can be positively discriminated from each other as required.

A further object of this invention is to provide a television receiver of the picture-in-picture type in which whenever the content of the picture displayed on the main picture screen is changed, the change in the discrimination indication of the picture content is displayed on the main picture screen and the discrimination indication of the unchanged sub-picture screen is also simultaneously displayed.

Yet a further object of this invention is to provide a picture-in-picture television receiver which can be used by the user more conveniently and usefully.

According to one aspect of the present invention, there is provided a television receiver having a cathode ray tube comprising: a composing circuit for composing a video signal for a main picture screen of said cathode ray tube type and a video signal for a sub-picture screen which is inset into a part of said main picture screen; a first adder for adding a picture discrimination indication signal to said video signal for said main picture screen; a second adder for adding a picture discrimination indication signal to said video signal for said sub-picture screen; and a system control circuit for controlling said composing circuit and the addition done by said first and second adders.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 2A to 2D and FIGS. 3A to 3I are respectively diagrams used to explain how to superimpose the picture discrimination indications on the main and the sub-picture screens;

FIG. 4 is a flow chart used to explain the operation in which when the content of a picture displayed on the main picture screen is changed, the picture discrimination indications are carried out both on the main and sub-picture screens;

FIG. 6 is a flow chart used to explain the further operation of this invention in which when the content of a picture displayed on the sub-picture screen is changed, the picture discrimination indication is carried out only in the sub-picture screen.

DESCRIPTION OF THE PREFERRED EMBODIMENT

An embodiment of a television receiver according to the present invention will now be described with reference to the attached drawings.

Figure 1:
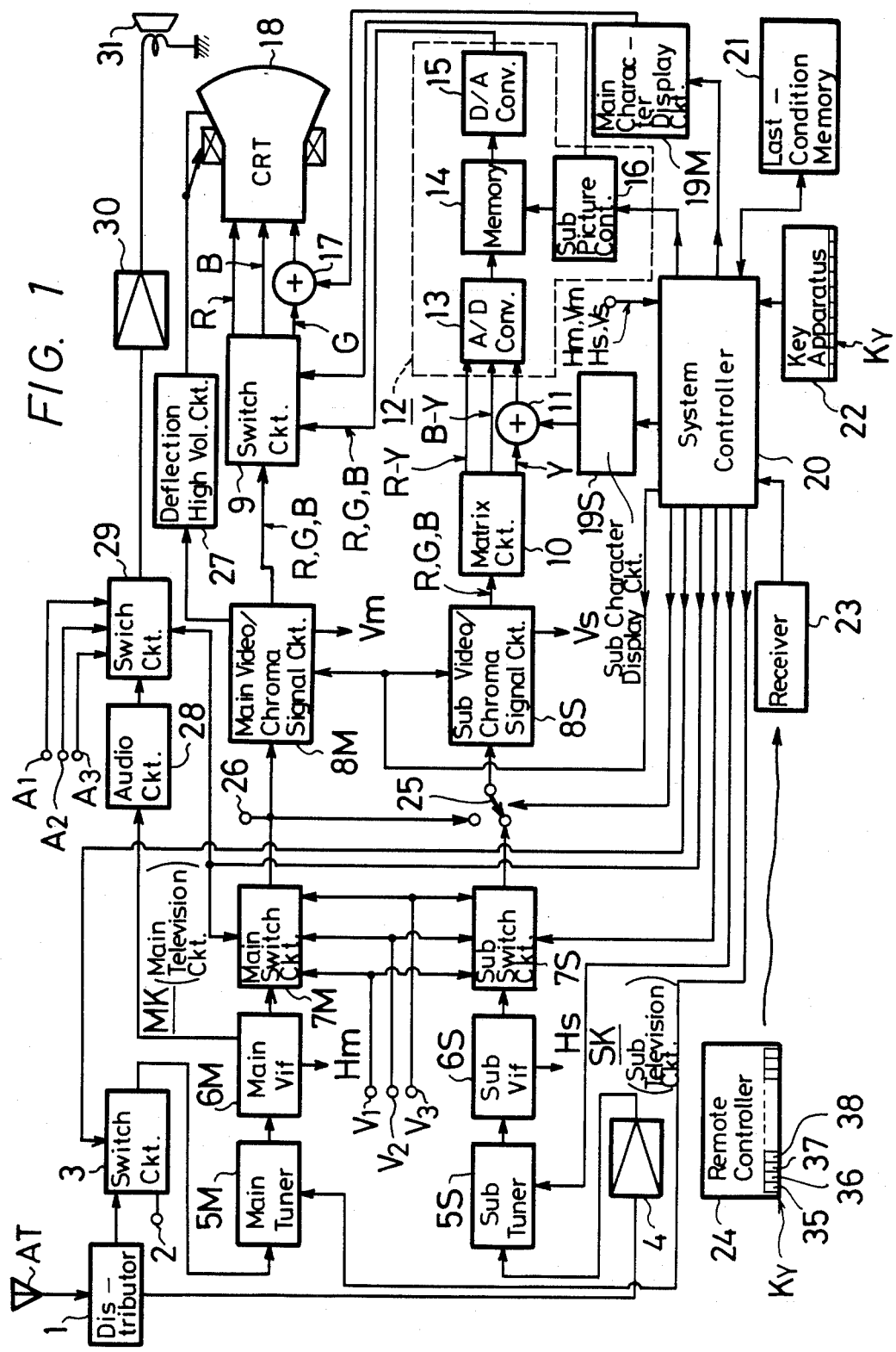
FIG. 1 is a block diagram showing an embodiment of a television receiver according to the present invention.

FIG. 1 is a block diagram showing an overall circuit arrangement of one embodiment of the television receiver according to the present invention.

Referring to FIG. 1, the television receiver of this invention includes a main television circuit MK and a sub-television circuit SK. From a video signal supplied by the main television circuit MK, a main picture is displayed on the whole picture screen of a cathode ray tube 18, whereas from a video signal supplied by the sub-television circuit SK, a sub-picture is displayed on one portion of the main picture screen in such a manner that the sub-picture is inset into the main picture. These main and sub-television circuits MK and SK include main and sub-tuners 5M, 5S, main and sub-video intermediate frequency circuits 6M, 6S and main and sub-video/chroma signal circuits 8M, 8S, respectively.

Further, the television receiver of the invention is provided with external video signal input terminals V1, V2 and V3 to which reproduced video signals (base band signals) from a VTR (video tape recorder) or the like are supplied. The video signals from these external input terminals V1, V2 and V3 can be selectively switched in place of the video signals from the tuners 5M and 5S by the main and the sub-switching circuits 7M and 7S provided in the television circuits MK and SK. The signal selected by the switching circuit 7M is then supplied to the cathode ray tube 18 to be displayed on its picture screen.

The sub-television circuit SK also includes a video signal processor circuit 12 for displaying the sub-picture on the picture screen of the cathode ray tube 18. The video signal processor circuit 12 controls the kinds of sub-pictures, such as a live picture, a still picture, a step-by-step picture or the like, the number of sub-pictures, the position of the sub-picture on the main picture screen, etc. By "live" picture is meant that the displayed image is animated rather than static.

Figure 2A:
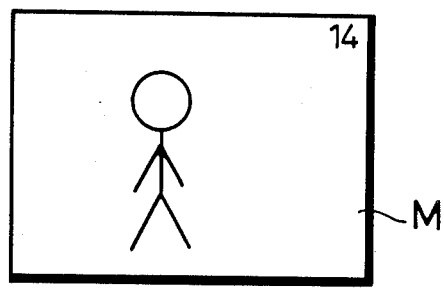
Figure 2B:
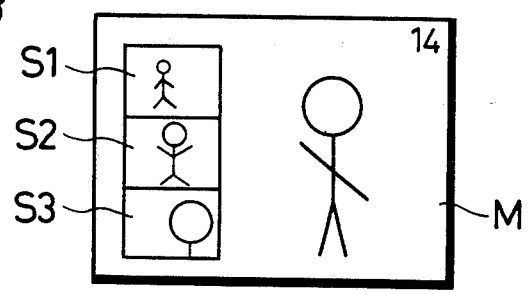
Figure 2C:
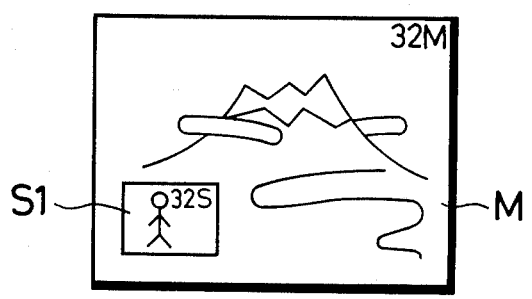

The main and sub-television circuits MK and SK are respectively provided with main and sub-character display circuits 19M and 19S to display picture discriminating indications 32M, 32S, respectively, such as the reception channel of a television broadcast or the ordinary number of the external video signal input terminals, for example, on the respective main picture screen and the sub-picture screen in an inset into fashion as shown in FIG. 2C.

There is provided a control circuit 20 which includes a micro-computer. The respective sections of the television receiver are controlled by this system control circuit 20 as will be explained in greater detail hereinafter.

The circuit arrangement of the television receiver according to this invention will now be described more fully. A television broadcast signal received by an antenna AT is supplied to a distributor 1. The distributor 1 supplies the received signal through a switching circuit 3 to the main tuner 5M without substantially attenuating the same and also supplies a portion of the received signal to the sub-tuner 5S. The received signal to be applied to the sub-tuner 5S is first amplified by a high frequency amplifier 4. The switching circuit 3 selectively switches between the antenna input signal from the distributor 1 and a high frequency input signal from a descrambler used for receiving a cable television broadcast or the like from an auxiliary input terminal 2 and supplies one of them to the main tuner 5M.

The video signal from the main tuner 5M is supplied to the main video intermediate frequency circuit 6M. Then, the video intermediate frequency signal therefrom is supplied to the main switching circuit 7M which can be selectively switched between this video signal and the external video signals from the external video input terminals V1 to V3. The signal selected by the switching circuit 7M is supplied to the main video/chroma signal circuit 8M. A monitor output terminal 26 is connected to the output side of the main switching circuit 7M. This main video/chroma signal circuit 8M generates red, green and blue color signals R, G and B which are then fed to a switching circuit 9.

The audio intermediate frequency signal from the main video intermediate frequency circuit 6M is supplied to an audio circuit (incorporating therein a sound multiplexing decoder circuit) 28. The audio signal from the audio circuit 28 is supplied to a switching circuit 29 which can be selectively switched between this audio signal and the external audio signals reproduced from the VTR and the like and supplied thereto from external audio signal input terminals A1, A2 and A3, respectively, corresponding to the above mentioned external video signal input terminals V1, V2 and V3. The audio signal selected by the switching circuit 29 is supplied through a low frequency amplifier 30 to a loudspeaker 31.

The horizontal and vertical synchronizing signals from the main video/chroma signal circuit 8M are supplied to a deflection/high voltage circuit 27. The deflection signal and the high DC voltage from the circuit 27 are supplied to the cathode ray tube 18.

The video signal from the sub-tuner 5S is supplied to the sub-video intermediate frequency circuit 6S. The video intermediate frequency signal therefrom is supplied to the sub-switching circuit 7S which selectively switches between this video signal and the external video signals from the external video signal input terminals V1 to V3. A switch 25 selects between the video signal selected by the switching circuit 7S and the video signal from the main switching circuit 7M and supplies the chosen video signal to the sub-video/chroma signal circuit 8S. From this sub-video/chroma signal circuit 8S, there are derived red, green and blue color signals R, G and B. These red, green and blue color signals R, G and B are supplied to a matrix circuit 10 in which they are converted to a luminance signal Y and red and blue color difference signals R-Y and B-Y, respectively, which are then fed to an A/D (analog-to-digital) converter 13 in the video signal processor circuit 12.

The A/D converter 13 is a time division type A/D converter as disclosed, for example, in Japanese published patent application No. 60-47792. The digital signal from the A/D converter 13 is supplied to a memory 14 and then written therein. The digital signal read out from the memory 14 is supplied to a D/A (digital-to-analog) converter 15 and is thereby converted to an analog signal. In the video signal processor circuit 12, sampling lines and picture elements of the video signal are selected and other lines and picture elements are thrown away or removed in correspondence with the ratio between the sizes of the main picture screen and the sub-picture screen. The memory 14 has frame (or field) memory areas corresponding to the maximum number of displayable sub-pictures, for example, four frame memory areas. This memory 14 is controlled by a sub-picture control circuit 16 so as to specify the kinds of sub-pictures, such as a live picture, a still picture, a step-by-step picture and so on, the number of sub-pictures, the position of the sub-picture on the main picture and the like.

When the sub-picture is displayed as a live, i.e. a real moving picture, the video signal is alternately written in and read out from the memory 14 continuously and repeatedly; when the sub-picture is displayed as a still picture, the video signal is written in the memory 14 for a selected frame or field period and then read out from the memory 14 repeatedly; and when the sub-picture is displayed as a step-by-step picture, a plurality of video signals are written in the memory 14 at different times corresponding to different frames or field periods and then read out therefrom repeatedly (see Japanese laid-open patent application No. 56-27573). The number of the sub-picture screens inset into the main picture screen is determined on the basis of the number of memory areas in the memory 14 which are used. The contents or pictures of the sub-picture screen can be a real moving picture, a still picture or a step-by-step picture based on the video signal from the sub-video/chroma signal circuit 8S or on the video signal from the main video/chroma signal circuit 8M. The switching of these video signals is carried out by the above mentioned switch 25. The picture contents on the main picture screen and the sub-picture screen can be exchanged with each other by simultaneously switching the reception channels of the main and sub-tuners 5M and 5S or by simultaneously switching the main and sub-switching circuits 7M and 7S.

The respective color signals from the main/video chroma signal circuit 8M and the respective color signals from the D/A converter 15 are supplied to the switching circuit 9 in which both groups of respective color signals are switched at appropriate timing intervals such that the sub-picture screen is inset into one portion of the main picture screen at a selected, predetermined position. This switching circuit 9 is controlled by the sub-picture control circuit 16, which is contolled by the system controller 20. The video signal from the switching circuit 9 is supplied to the cathode ray tube 18.

The main picture discrimination indicating signal, such as a signal indicative of the main channel number, is formed by the main character display circuit 19M and is added to the video signal by an adder 17 connected between the switching circuit 9 and the cathode ray tube 18. In this example, the adder 17 is interposed only in the transmission path of the green color signal G to thereby superimpose a green picture discrimination indication upon the main picture screen. It is of course possible that this picture discrimination indication can be made by using other colors.

The sub-picture discrimination indicating signal, formed by the sub-character display circuit 19S and which could be indicative of the channel number selected by the sub-tuner 5S, for example, is added to the sub-video signal by an adder 11 connected between the matrix circuit 10 and the A/D converter 13. In this example, an adder 11 is interposed only in the transmission path of the luminance signal Y to thereby superimpose a white picture discrimination indication on the sub-picture screen. Also, it is possible that this picture discrimination indication can be made by using other colors.

The channel selections in the above mentioned main tuner 5M and sub-tuner 5S are carried out by channel selection signals from the system control circuit 20. The switching circuits 3, 7M, 7S, 29 and the switch 25 are also selectively switched under the control of the system control circuit 20. The main and sub-video/chroma signal circuits 8M and 8S are subjected to blanking by the system control circuit 20 for a short period upon the up and down scanning channel selection operation. Alternatively, this blanking may be carried out by a blanking switch that is provided at the prestage of the cathode ray tube 18. Further, main and sub-horizontal synchronizing signals Hm and Hs from the main and sub-video intermediate frequency circuits 6M and 6S and main and sub-vertical blanking signals (vertical signals) Vm and Vs from the main and sub-video/chroma signal circuits 8M and 8S are supplied to the system control circuit 20. The main picture and sub-picture discrimination indicating signal circuits 19M and 19S and the sub-picture control circuit 16 are controlled by the system control circuit 20.

A last-condition memory 21 is provided which stores, under the control of the system control circuit 20, the selected channels of the main and sub-tuners 5M and 5S, the switch conditions of the switching circuits 7M and 7S, the control conditions of the sub-picture control circuit 16 and so on when the power of the television receiver is turned off. When the television receiver is powered on again, the conditions of the respective circuits presented when the power of the television receiver was last turned off are reproduced under the control of the system control circuit 20.

A key apparatus 22 is connected to the system control circuit 20 and is provided with various kinds of keys KY to control the television receiver.

Reference numeral 24 denotes a remote controller (commander) which is also provided with various kinds of keys KY to control the television receiver. This remote controller 24 is also provided with a transmitter (not shown) to transmit a remote control signal based on the corresponding key operation. A receiver 23 for receiving the signal transmitted from the transmitter of the remote controller 24 is connected to the system control circuit 20. The remote control signal can be transmitted by means of a light beam, radio wave, sound wave and so on.

By way of example, the keys KY of the key apparatus 22 or the remote controller 24 will be enumerated as follows: a power key 33; a recall key 34 (used to display the picture discrimination indication such as the channel number); a mute key (used to mute the sound); ten keys (designated generally by the reference numeral 35) used to select the reception channel and the number of the external video signal input terminal; a TV (television)/VTR change-over key; an antenna input/auxiliary high frequency input change-over key; a sound multiplexing key; up and down keys 36 for incrementing and decrementing the contrast of luminance and chrominance signals, the main reception channels, and the number of the main external video signal input terminal, and the sound volume respectively; an on-off key 37 for the sub-picture screen; up and down keys 38 for incrementing and decrementing the sub-reception channel and the number of the sub-external video signal input terminal; a still picture key; a step-by-step picture key; a shift key used to shift the position of the sub-picture screen; and a main-sub exchange key 39 used to exchange the picture contents on the main picture and sub-picture screens.

How to superimpose the picture discrimination indications on the respective picture screens will now be described with reference to FIGS. 2 and 3.

FIG. 2A shows the case where only the main picture screen (real moving picture) M is displayed on the picture screen of the cathode ray tube 18. In this case, when the recall key 34 on the remote controller 24 is depressed, a channel number, for example, "14" is displayed in green on this main picture screen M at, for example, the upper right-hand corner of the screen as a picture discrimination indication. The numbers of the external video (identification) signal input terminals V1, V2 and V3 would similarly be displayed as "V1", "V2" and "V3", by way of example.

FIG. 2B shows the case where a step-by-step picture composed of sub-picture screens $S_1$, $S_2$ and $S_3$ of three still pictures is displayed on the main picture screen (real moving picture) M at its left-hand side in the up and down direction. In this case, when the recall key 34 on the remote controller 24 is depressed, the channel number "14" is displayed in green only on the main picture screen M and not on the sub-picture screens $S_1$, $S_2$, or $S_3$.

FIG. 2C shows a case where a sub-picture screen (real moving picture) $S_1$ is inset into the main picture screen (real moving picture) M at its lower left-hand corner. In this case, when the recall key 34 on the remote controller 24 is depressed, the channel number "14" is displayed in green on the upper right-hand corner of the main picture screen M and also a channel number, for example "22", is displayed in white on the upper right-hand corner of the sub-picture screen $S_1$.

Figure 2D:
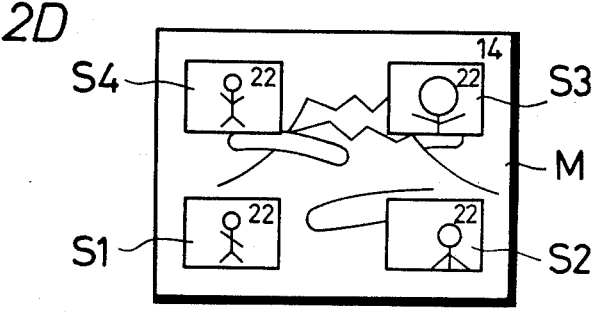

FIG. 2D shows a case where the real moving picture $S_1$ and step-by-step still pictures $S_2$, $S_3$ and $S_4$, taken at different times from the real moving picture signal displayed on $S_1$, each being displayed on a separate sub-picture screen inset into, for example, the four corners of the main picture screen (real moving picture) M. In this case, when the recall key 34 of the remote controller 24 is depressed, the channel number "14" is displayed in green on the upper right-hand corner of the main picture screen M and a channel number "22" is displayed in white on the upper right-hand corner of each of the four sub-picture screens $S_1$ to $S_4$.

The display operation of the television receiver of the invention will now be described more fully with reference to FIGS. 3A to 3I.

When only the main picture screen M (real moving picture) is displayed as shown in FIG. 3A, if the on-off key 37 of the remote controller 24 for the sub-picture screen is depressed, the sub-picture screen $S_1$ (real moving picture) is displayed as shown in FIG. 3B. At that time, the channel number "22" is displayed in white on the upper right-hand corner of the sub-picture screen $S_1$ for a time period of, for example, 2 seconds and then the indication of the channel number "22" disappears as shown in FIG. 3C.

When the main picture screen M (real moving picture) and the sub-picture screen $S_1$ (real moving picture of the channel 22) are both displayed as shown in FIG. 3D, if the up key or down key 38 of the sub-reception channel on the remote controller 24 is depressed, the picture on the sub-picture screen $S_1$ is changed and also a channel number, for example "10", thereof is displayed in white on the sub-picture screen $S_1$ for a time period of, for example, 2 seconds as shown in FIG. 3E. Thereafter, the indication of the channel number "10" disappears as shown in FIG. 3F.

When the main picture screen M (real moving picture of the channel 14) and the sub-picture screen $S_1$ (real moving picture of the channel 22) are both displayed as shown in FIG. 3G, if the main-sub exchange key 39 on the remote controller 24 used to exchange the contents of the picture on the main and sub-picture screens is depressed, as shown in FIG. 3H, the contents of the pictures on the main picture screen M and the sub-picture screen $S_1$ are exchanged and also the channel number "22" is displayed on the main picture screen M and the channel number "14" is displayed on the sub-picture screen $S_1$ for a time period of, for example, 2 seconds.

Thereafter, the indications of the respective channel numbers "14" and "22" disappear as shown in FIG. 3I.

According to the present invention as set forth above, the picture discrimination indications of the main picture and the sub-picture screens can be positively discriminated from each other as required during and after changes in the display.

The operation of the television receiver according to the present invention will be described further.

When the up key or down key 36 of the remote controller 24 for incrementing or decrementing the main reception channel and the number of the main external video signal input terminal is depressed to thereby change the content of the picture displayed on the main picture screen, the picture discrimination indications are carried out on both of the main and sub-picture screens. At that time, the television receiver of the present invention will be operated under the control of the system controller 20 in accordance with a flow chart of FIG. 4 under the control of the system control circuit 20.

Referring to the flow chart of FIG. 4, when the up key or down key is depressed at step 1, the system controller 20 causes the video blanking operations of the main and sub-picture screens to be carried out at step 2. The video blankings are carried out by, for example, the main and sub-picture/chroma signal circuits 8M and 8S, respectively. At step 3, a picture of the video signal from the main tuner 5M is displayed on the main picture screen and the main reception channel is moved in the up or down direction to reset the channel selection data (PLL (phase locked loop) data) of the main tuner 5M. Also at step 3, when the picture of the video signal from the external video signal input terminals V1 to V3 is displayed on the main picture screen and the number of the external video signal input terminal is moved upward or downward, the change-over switch data of the main switching circuit 7M is set in response to the incremented or decremented number of the external video signal input terminal whereby the main switching circuit 7M is switched so as to generate the video signal of the external video signal input terminal of the incremented or decremented number. Then, the picture discrimination indication data of the main picture screen is set at step 4. This picture discrimination indication data is supplied by the system controller 20 to the main character display circuit 19M which generates the main picture discrimination indication signal. Subsequently, the picture discrimination indication data of the sub-picture screen is set at step 5. This picture discrimination indication data is supplied by the system controller 20 to the sub-character display circuit 19S which generates the sub-picture discrimination indication signal. At step 6, the video blanking is released. The main picture whose picture content has been changed is then displayed on the main picture screen along with the sub-picture whose picture content has not been changed. In this case, the main and sub-picture discrimination indications are carried out on both the main and the sub-picture screens, respectively. The picture discrimination indications will be erased after, for example, 2 seconds at step 7.

Figure 5A:
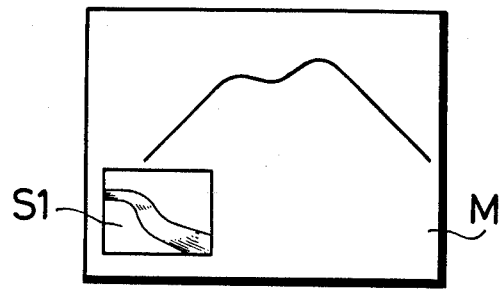
FIGS. 5A and 5B are schematic diagrams respectively used to explain the operation carried out in accordance with the flow chart of FIG. 4.
Figure 5B:
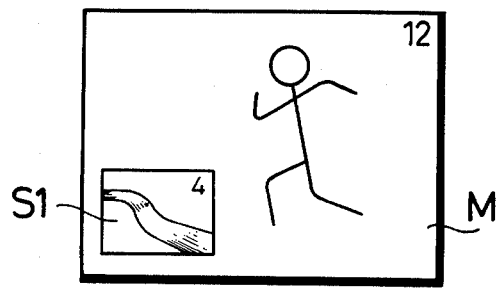

This sequence is illustrated in FIGS. 5A and 5B. In FIG. 5A the picture contents are displayed on the main and sub-picture screens M and $S_1$ before the main picture channel selection up key, for example, is depressed. If the up key 36 is then depressed, as shown in FIG. 5B, the picture content displayed on the main picture screen M is changed and the new picture discrimination indications are displayed on both the main and sub-picture screens M and S₁. These picture discrimination indications are erased after 2 seconds.

Further, in this embodiment, when the up key or down key 38 of, for example, the remote controller 24 is depressed to increment or decrement the sub-reception channel or the number of the sub-external video signal input terminal and hence the picture content displayed on the sub-picture screen is changed, the picture discrimination indication is carried out only on the sub-picture screen. That is, at that time, the television receiver of the invention is operated in accordance with a flow chart of FIG. 6 under the control of the system controller circuit 20.

Referring to the flow chart of FIG. 6, the up or down key 38 is depressed at step 10. Then, at step 20, when the picture of the video signal from the sub-tuner 5S is displayed on the sub-picture screen S₁ and the sub-reception channel is incremented or decremented, the system controller 20 causes the channel selection data of the sub-tuner 5S to be set in response to the reception channel incremented or decremented, whereby the sub-tuner 5S is placed in the channel selection mode for selecting the incremented or decremented reception channel. If, however, at the step 20 the picture of the video signal from the external video signal input terminals V1 to V3 is displayed on the sub-picture screen S₁ and the number of the external video signal input terminal is incremented or decremented, the switching data for changing-over the sub-switching circuit 7S is set in response to the number of the external video signal input terminal incremented or decremented, whereby the sub-switching circuit 7S is switched so as to generate the video signal of the external video signal input terminal corresponding to the incremented or decremented number. Then, the picture discrimination indication data of the sub-picture screen is set at step 30. So, this picture discrimination indication data is supplied to the sub-character display circuit 19S from which the sub-picture screen discrimination indication signal is generated. By the operations at steps 20 and 30, the sub-picture whose picture content is changed is displayed on the sub-picture screen and the corresponding picture discrimination indication of the sub-picture is displayed on this sub-picture screen. In this case, a main picture having the same picture content as that of the original main picture is displayed on the main picture screen. Then, at step 40, the picture discrimination indication on the sub-picture screen is erased after, for example, 2 seconds.

Figure 7A:
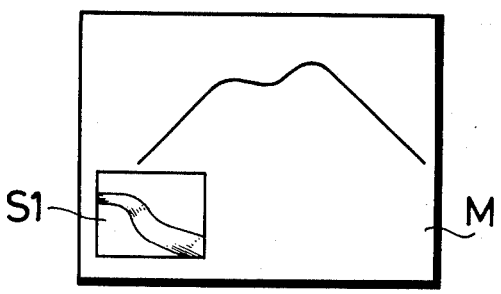
FIGS. 7A and 7B are schematic diagrams respectively used to explain the further operation of this invention carried out in accordance with the flow chart of FIG. 6.
Figure 7B:
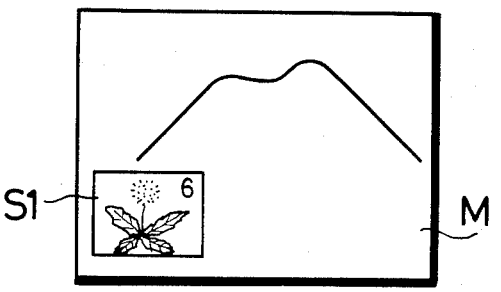

For example, when the picture contents shown in FIG. 7A are displayed on the main and sub-picture screens M and S₁ before the up key 38 is depressed, if the up key 38 is depressed, the picture discrimination indication is carried out only on the sub-picture screen S₁ which is changed as shown in FIG. 7B. Then, this picture discrimination indication is erased after 2 seconds.

According to the above embodiment of the present invention, when the picture content displayed on the main picture screen is changed, not only is the corresponding picture discrimination indication displayed on the main picture screen but also the picture discrimination indication is displayed on the sub-picture screen. Accordingly, the user positively confirms that the picture content displayed on the sub-picture screen remains unchanged.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

I claim as my invention:

1. A television receiver comprising:
   (a) a cathode ray tube having a picture screen which is divisible into a main picture screen and one or more sub-picture screens inset into the main picture screen;
   (b) a main picture circuit for selecting a first video signal from a plurality of video signals and supplying it as the main picture screen video signal;
   (c) a sub-picture circuit for selecting a second video signal from a plurality of video signals and supplying the selected video signal as a sub-picture video signal for one or more of said sub-picture screens inset into the main picture screen of said cathode ray tube;
   (d) a composing circuit for composing the selected video signal for a main picture screen of said cathode ray tube and the selected video signal for a sub-picture screen which is inset into a part of said main picture screen into a composite signal which is supplied to the cathode ray tube;
   (e) a first adder for adding a picture discrimination indication signal to said video signal for said main picture screen;
   (f) a second adder for adding a picture discrimination indication signal to said video signal for said sub-picture screen; and
   (g) a system control circuit for controlling said main and sub-pictures circuits, said composing circuit and said first and second adders such that said sub-picture discrimination signal is displayed on said sub-picture screen whenever said sub-picture circuit selects a different second video signal from said plurality of signals.

2. A television receiver according to claim 1, further comprising a recall key for said picture discrimination indication and wherein the system control circuit controls the adders such that if said recall key is operated when only the main picture screen is displayed on said cathode ray tube, the discrimination indication of said picture is also displayed on said main picture screen.

3. A television receiver as claimed in claim 2, wherein the system control circuit controls the adders such that if said recall key is operated when said main picture screen and a plurality of sub-picture screens whose picture contents are the same as that of said main picture screen but taken at different times from the main picture screen are displayed, only the the discrimination indication of the picture on said main picture screen is displayed.

4. A television receiver as claimed in claim 2, wherein the system control circuit controls the adders such that if said recall key is operated when said main picture screen and said sub-picture screen are displaying pictures from different signals, the discrimination indications of the pictures on said main and sub-picture screens are displayed thereon, respectively.

5. A television receiver as claimed in claim 2, wherein the system control circuit controls the adders such that if said recall key is operated when said main picture screen is displaying a picture different from the pictures displayed on the plurality of said sub-picture screens, the discrimination indications of the pictures on said main picture screen and said plurality of sub-picture screens are displayed on the respective screens.

6. A television receiver according to claim 1 further comprising an on/off key for said sub-picture screen and wherein the system control circuit controls the adders such that if said on/off switch is operated when only said main picture screen is displayed, said sub-picture screen is displayed and at the same time a discrimination indication of said sub-picture screen is displayed thereon for a predetermined period of time.

7. A television receiver according to claim 1 further comprising a channel up/down key for changing the sub-channel of said sub-picture screen and wherein the system control circuit controls the adders such that if said channel up/down key is operated when said main picture screen is displaying a picture different from that displayed on the sub-picture screen, the picture of said sub-picture screen is changed and at the same time a discrimination indication of said sub-picture screen is displayed thereon for a predetermined period of time.

8. A television receiver according to claim 1 further comprising an exchange key for exchanging the pictures between said main and sub-picture screen and wherein the system control circuit controls the adders such that if said exchange key is operated when different pictures are produced on said main and sub-picture screens, the pictures of said main and sub-picture screens are exchanged with each other and the discrimination indications of said main and sub-picture screens are respectively displayed thereon for a predetermined period of time.

9. A television receiver according to claim 1 further comprising channel selection keys for said main and sub-pictures and wherein the system control circuit controls the adders such that if said channel selection key for said main picture is operated when different pictures are produced on said main and sub-picture screens, the picture on said main picture screen is changed and at the same time the discrimination indications of said main and sub-picture screens are respectively displayed thereon for a predetermined period of time.

10. A television receiver as claimed in claim 9, wherein the system control circuit controls the adders such that if said channel selection key for said sub-picture is operated when different pictures are produced on said main and sub-picture screens, the picture on said sub-picture screen is changed and at the same time the discrimination indication of said sub-picture screen is displayed thereon for a predetermined period of time.

11. A television receiver as claimed in claim 10, wherein the system control circuit controls the adders such that when said channel selection key for said sub-picture is further operated, the picture on said sub-picture screen is changed and at the same time only the discrimination indication of said sub-picture screen is displayed for a predetermined period of time.

* * * * *